United States Patent
Lee et al.

(10) Patent No.: US 7,430,408 B2
(45) Date of Patent: Sep. 30, 2008

(54) DATA REPRODUCING METHOD AND APPARATUS FOR MOBILE PHONE

(75) Inventors: Chang Kwon Lee, Seoul (KR); Hyun Soo Kim, Kyunggi-Do (KR); Moo Rak Choi, Busan (KR)

(73) Assignee: LG Electronics Inc., Seoul (KR)

( * ) Notice: Subject to any disclaimer, the term of this patent is extended or adjusted under 35 U.S.C. 154(b) by 373 days.

(21) Appl. No.: 09/910,709

(22) Filed: Jul. 24, 2001

(65) Prior Publication Data

US 2002/0013143 A1 Jan. 31, 2002

(30) Foreign Application Priority Data

Jul. 25, 2000 (KR) ............... 2000-42856

(51) Int. Cl.
*H04L 12/58* (2006.01)

(52) U.S. Cl. .................. 455/412.1; 379/88.12

(58) Field of Classification Search ............. 379/67.1, 379/88.22, 88.18, 88.23, 201, 412.1, 413, 379/414.1, 414.3; 455/412.1, 413, 414.1, 455/414.3

See application file for complete search history.

(56) References Cited

U.S. PATENT DOCUMENTS

| | | | | |
|---|---|---|---|---|
| 5,446,553 A | * | 8/1995 | Grube | 358/402 |
| 5,630,205 A | * | 5/1997 | Ekelund | 455/412.1 |
| 6,023,620 A | * | 2/2000 | Hansson | 455/419 |
| 6,097,967 A | * | 8/2000 | Hubbe et al. | 455/558 |
| 6,167,280 A | | 12/2000 | Barrett et al. | |
| 6,496,692 B1 | * | 12/2002 | Shanahan | 455/418 |
| 6,570,080 B1 | * | 5/2003 | Hasegawa et al. | 84/609 |
| 6,622,015 B1 | * | 9/2003 | Himmel et al. | 379/67.1 |
| 6,792,280 B1 | * | 9/2004 | Hori et al. | 455/517 |
| 7,051,003 B1 | * | 5/2006 | Kobata et al. | 705/51 |
| 7,065,342 B1 | * | 6/2006 | Rolf | 455/412.1 |
| 7,082,469 B2 | * | 7/2006 | Gold et al. | 709/231 |
| 2002/0013155 A1 | * | 1/2002 | Jamthe et al. | 455/517 |
| 2002/0023013 A1 | * | 2/2002 | Hughes et al. | 705/26 |
| 2002/0023099 A1 | * | 2/2002 | Wendelrup | 707/200 |
| 2002/0065066 A1 | * | 5/2002 | Takagaki | 455/412 |
| 2004/0005880 A1 | * | 1/2004 | Shanahan | 455/418 |
| 2004/0092251 A1 | * | 5/2004 | Fell et al. | 455/412.1 |
| 2004/0110545 A1 | * | 6/2004 | Kim, II | 455/575.1 |
| 2004/0171378 A1 | * | 9/2004 | Rautila | 455/419 |
| 2005/0223224 A1 | * | 10/2005 | Carpentier et al. | 713/165 |

FOREIGN PATENT DOCUMENTS

KR 10-2000-0039765 7/2000

* cited by examiner

*Primary Examiner*—Olisa Anwah
(74) *Attorney, Agent, or Firm*—KED & Associates, LLP

(57) ABSTRACT

A data file reproducing method for a personal terminal which can include providing a data file by connecting a data supplying server to a communication network, selecting a data file, connecting the data supplying server to a personal terminal, transferring the selected data file to the personal terminal, and storing automatically the transferred data file in the personal terminal. A data reproducing apparatus for a personal terminal which can include a wireless transceiver that can transfer and receive data files to and from a mobile communication network, a storage device, a controller, a decoder and a reproducing unit.

17 Claims, 7 Drawing Sheets

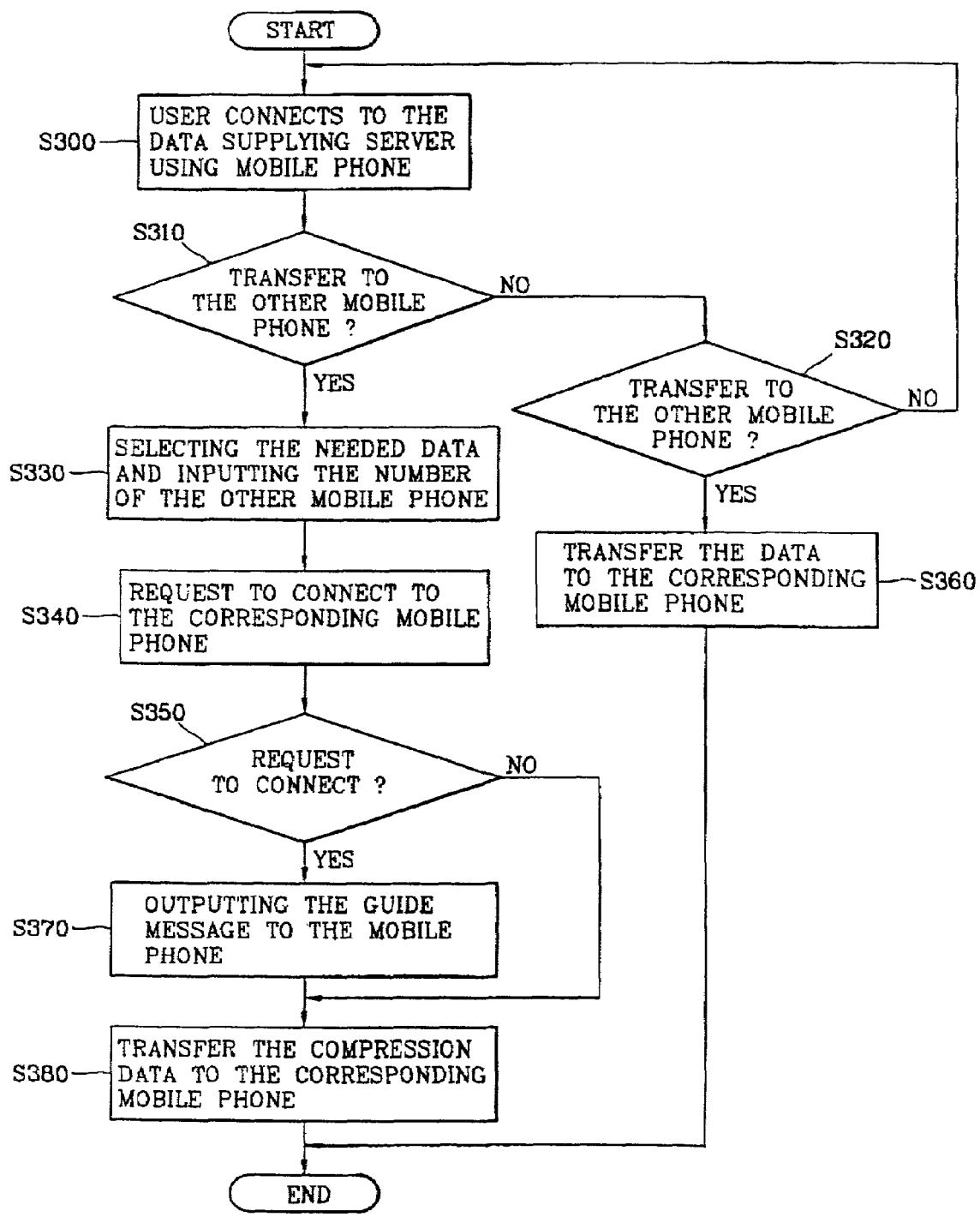

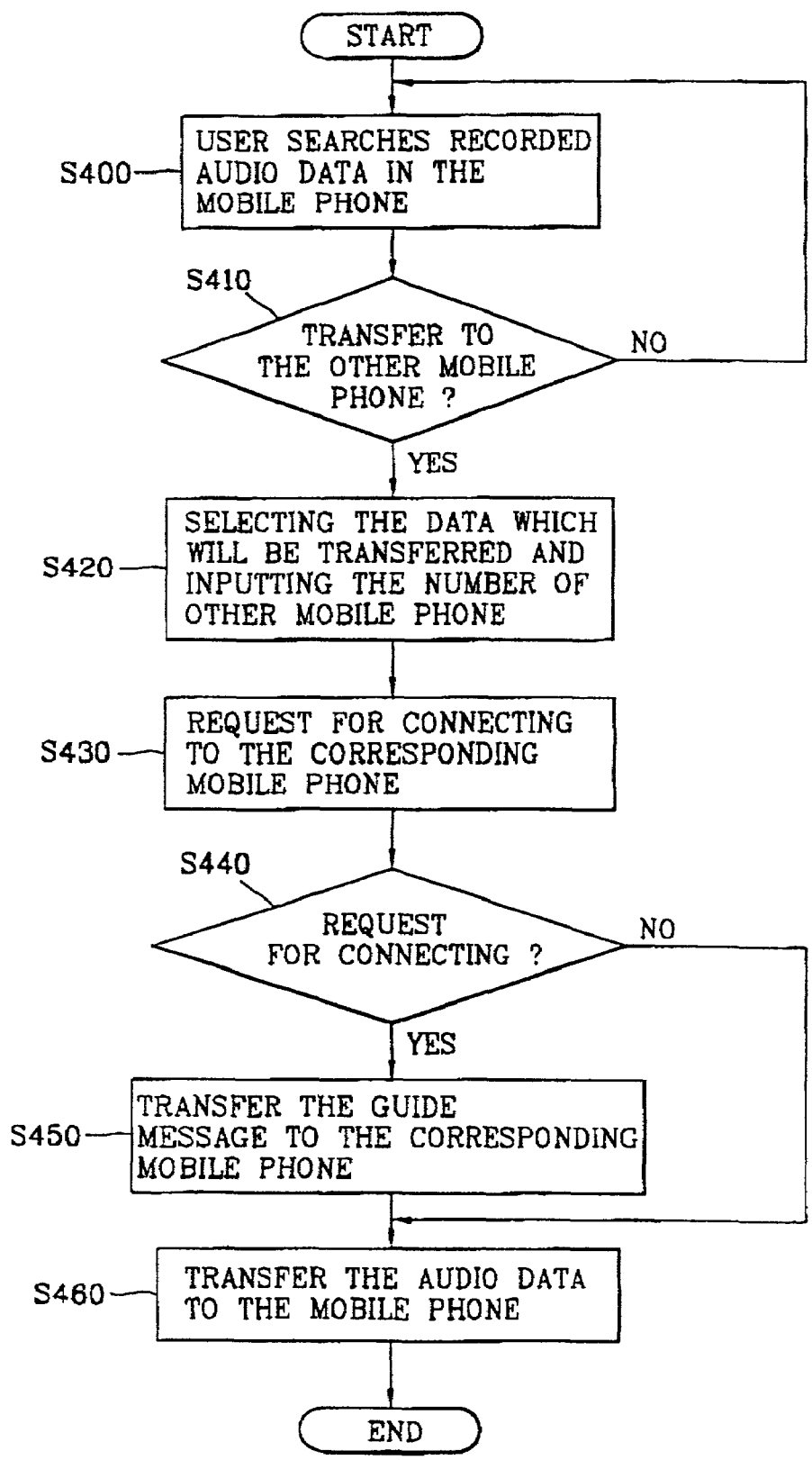

DATA REPRODUCING METHOD AND APPARATUS FOR MOBILE PHONE

BACKGROUND OF THE INVENTION

1. Field of the Invention

The present invention relates to a data reproducing method and apparatus for a mobile phone.

2. Background of the Related Art

As data compaction technology has developed the ease at which a user is able to use video or audio data through compression data files supplied via the internet improves. Also, personal terminals such as mobile phones and PDAs (Personal Digital Assistants) having data reproducing function have been developed, making compression data files more easily stored and reproduced through processors in the personal terminal mobile phones and PDAs.

FIG. 1 is a block diagram showing a process of storing compression data in a mobile phone. In FIG. 1, a network for supplying music files to a personal terminal 10 which is able to reproduce the compression data is illustrated. As shown therein, when a user connects to a compression data supplying server 40 connected to a communication network 30 through a personal computer 20, the compression data supplying server 40 supplies information about a compression data file to the user. The user can then search the information, select data as desired, and download the selected compression data files to a personal computer 20 from the compression data supplying server 40. Then, the user can connect a personal terminal 10 to the personal computer 20, and download the compression data files stored in the personal computer 20 into the personal terminal 10.

However, according to the method described above, the user downloads the compression data in the personal computer, and then, in a separate step, stores the data in the personal terminal 10, whereby a long time is needed to store the data in the personal terminal 10. In addition, when the user stores the data in the personal terminal 10, the user must connect the personal terminal 10 to the personal computer 20, which may not be convenient for the user.

Also, when the user wants to transfer the data to another person, the user must store the data in a storing medium such as a diskette, before the data can be downloaded into a personal terminal or computer of the other person. In order to make the transfer, the data files are loaded into a personal computer before the data files are loaded from the personal computer to the personal terminal of the other person. Thus requiring additional time and effort when data transfer between personal terminals is desired.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Therefore, an object of the present invention is to provide a compression data file reproducing method and apparatus for a mobile phone by which a user reproduces wanted data on a mobile phone by directly storing the compression data file supplied from the communication network wirelessly.

Another object of the present invention includes a data file reproducing method for a personal terminal including providing a data file by connecting a data supplying server to a communication network, selecting a data file, connecting the data supplying server to a personal terminal, transferring the selected data file to the personal terminal, and storing automatically the transferred data file in the personal terminal.

Another object of the present invention includes a data reproducing apparatus for a personal terminal including a wireless transferring and receiving unit for transferring and receiving data files to and from a mobile communication network, a storing unit for storing the data files received through the wireless transferring and receiving unit, a controlling unit for searching the received data files through the wireless transferring and receiving unit and for storing the data in the storing unit if the data file has a compression format, a decoder for decoding the compression data files transferred from the wireless transferring and receiving unit, and a reproducing unit for reproducing the decoded data files into audio or video signals.

Another object of the present invention includes a data reproducing apparatus for a personal terminal including a wireless transceiver that transfers and receives data files to and from a mobile communication network, a codec that compresses and amplifies a signal received by the wireless transceiver, a storage device that stores the data file received through the wireless transceiver and the signal compressed in the codec, a controller that searches the data files received through the wireless transceiver and controls the storage of the data files if the data files has the compression format, and controls the compression, amplification and storage of the signal received by the wireless transceiver, a decoder that decodes the data transferred from the wireless transceiver, and a reproducer that reproduces the data file amplified in the codec and the data outputted through the decoder as an audio or video signal.

Another object of the present invention includes a method for communicating a data file from a communication network to a personal terminal, including connecting the communications network to the personal terminal, sending a guide message from the communications network soliciting the personal terminal for reception of the data file, sending the data file from the communications network to the personal terminal, and disconnecting the connection between the communications network and the personal terminal.

To achieve the object of the present invention, there is provided a data reproducing method which includes connecting a data supplying server by using a personal computer of user, selecting a needed data, and inputting a number of mobile phone for receiving, connecting the data supplying server to the mobile phone having the inputted mobile phone number through a mobile communication network, transferring a guide message and the selected data to the mobile phone after the connected to the mobile phone, and storing automatically the transferred data in the mobile phone.

Another object of the present invention includes providing a wireless transferring/receiving unit for transferring/receiving data to mobile phone network, a storing unit for storing the compression data transferred through the wireless transferring/receiving unit, a controlling unit for searching the compression data transferred through the wireless transferring/receiving unit, and storing the data in the storing unit if the compression data has a compressing format which is set before, and a decoder for decoding the compression data transferred from the wireless transferring/receiving unit, and a reproducing unit for reproducing the decoded data as an audio/video.

Another object of the present invention includes providing a wireless transferring/receiving unit for transferring/receiving a data to mobile communication network, a codec unit for compressing and amplifying an audio signal inputted from outside, a storing unit for storing the data received through the wireless transferring/receiving unit and the audio data compressed in the codec unit, a controlling unit searching the compression data received through the wireless transferring/receiving unit and controlling the store of the data in the storing unit or controlling the compression/amplifying and store of the audio signal inputted from the outside, a decoder for decoding the data transferred from the wireless transfer/receive unit, and a reproducing unit for reproducing the data amplified in the codec unit and the data outputted from the decoder as an audio or video.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 6 is a flow chart showing a method for direct connect to a data supplying server using the mobile phone according to a preferred embodiment of the present invention; and FIG. 7 is a flow chart showing a method for transferring an audio/music data recorded in the mobile phone according to a preferred embodiment of the present invention.

DETAILED DESCRIPTION OF PREFERRED EMBODIMENTS

Figure 1:
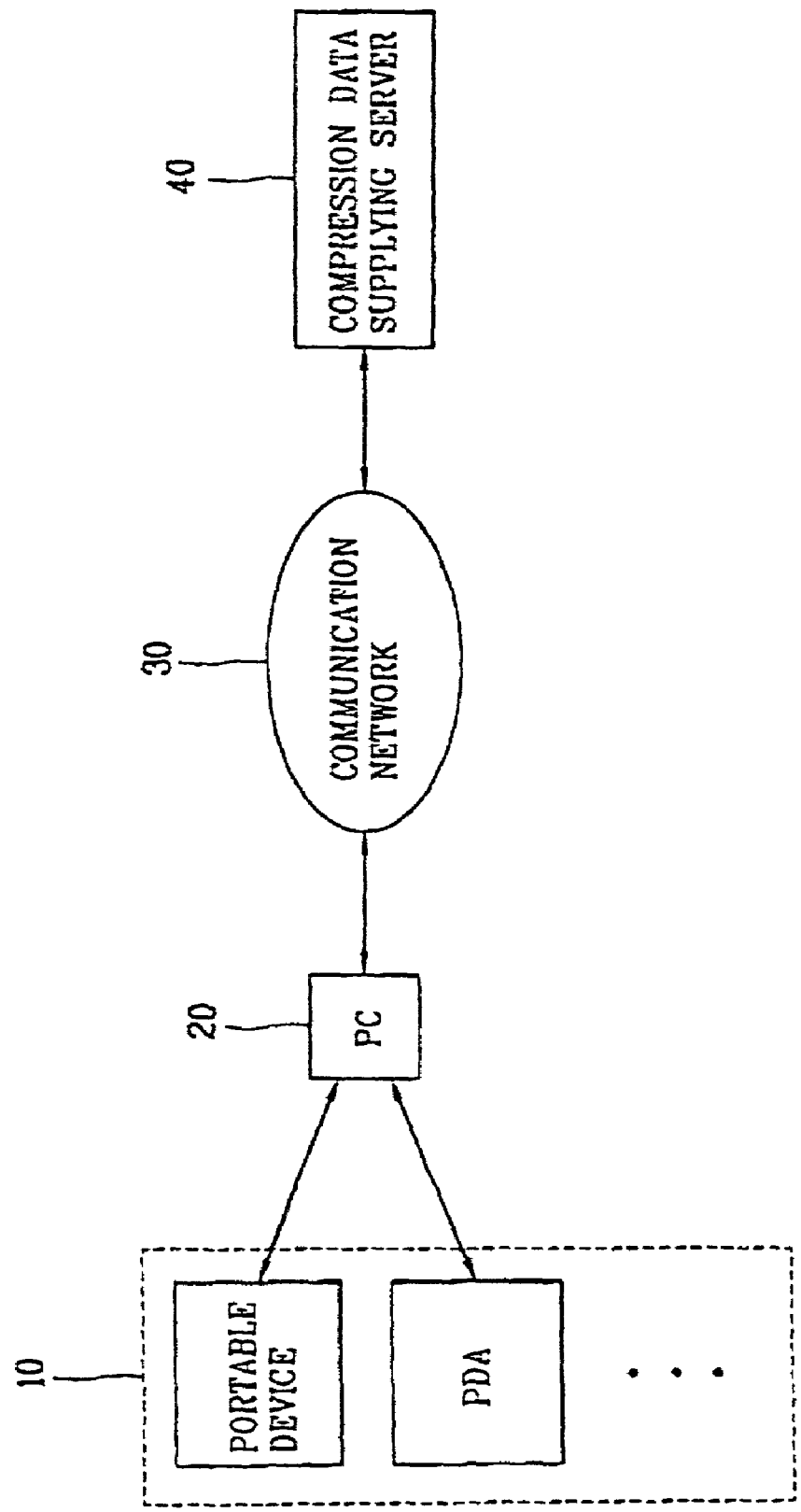
FIG. 1 is a block diagram showing an entire network for supplying music file to a mobile phone according to the related art.
Figure 2:
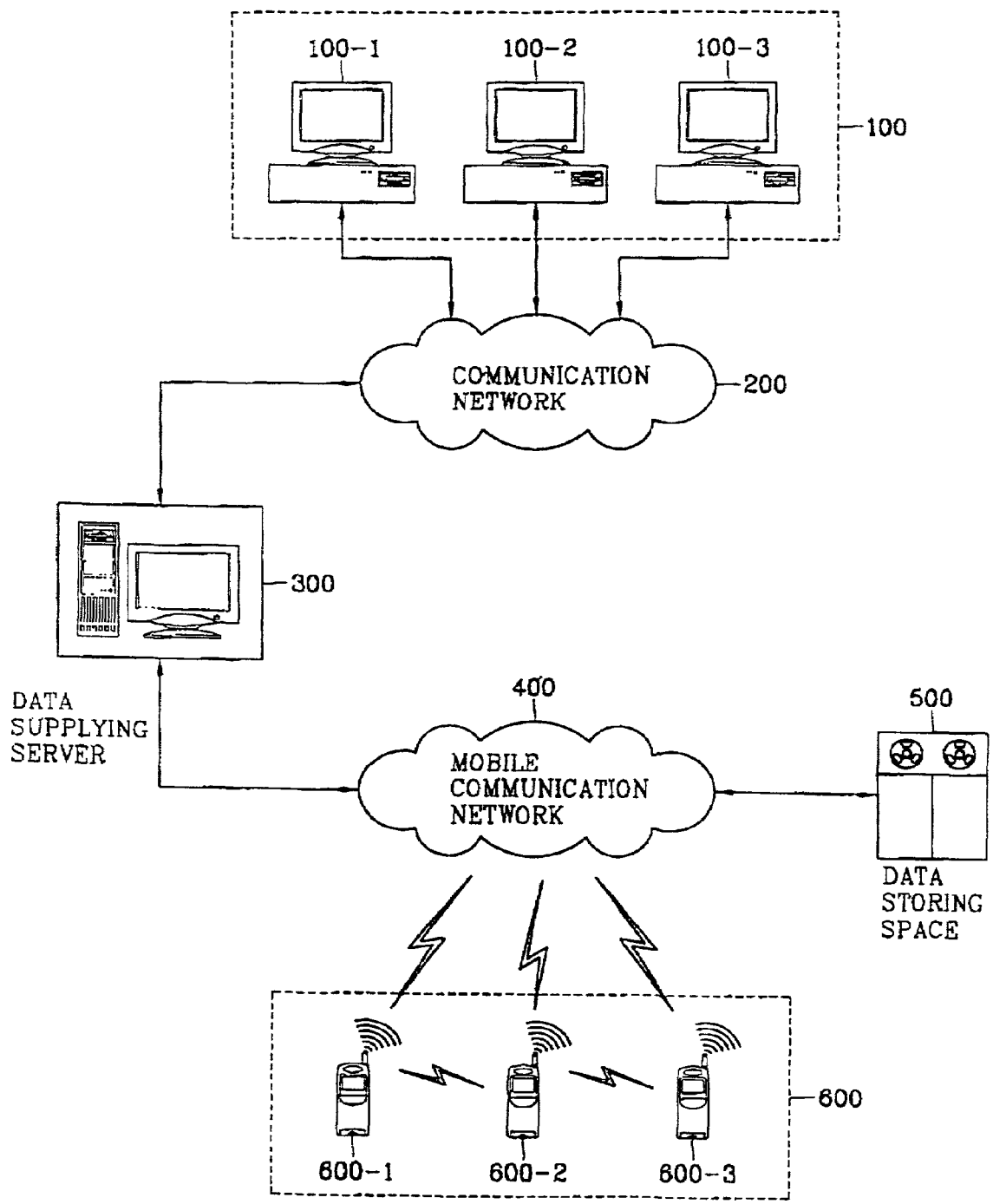
FIG. 2 is a block diagram showing an entire network for transferring a data file to a mobile phone according to a preferred embodiment of the present invention.

FIG. 2 is a block diagram illustrating an entire network for transferring a data file to a wireless transceiver or a personal terminal, such as a mobile phone or a personal digital assistant, according to a preferred embodiment of the present invention. As shown in FIG. 2, the entire network can include a data supplying server 300 which can be used for supplying compression data to the mobile phone (which will be used to represent a personal terminal), a Personal Computer (PC) 100, which may include one or more PCs 100-1, 100-2, 100-3, which can be used for connecting to the data supplying server 300 using a communication network 200 such as the internet, and a mobile phone 600 which can be used for receiving a data file transferred from the data supplying server 300. Additionally, a mobile communication network 400 can be included for connecting the data supplying network 300 to the mobile phone 600, and a data storing space 500, which can be connected to the mobile communication network 400 for storing message and data files which can be transferred to a user of the mobile communication network 400 via a mobile phone 600 or multiple mobile phones 600-1, 600-2, 600-3.

Figure 3:
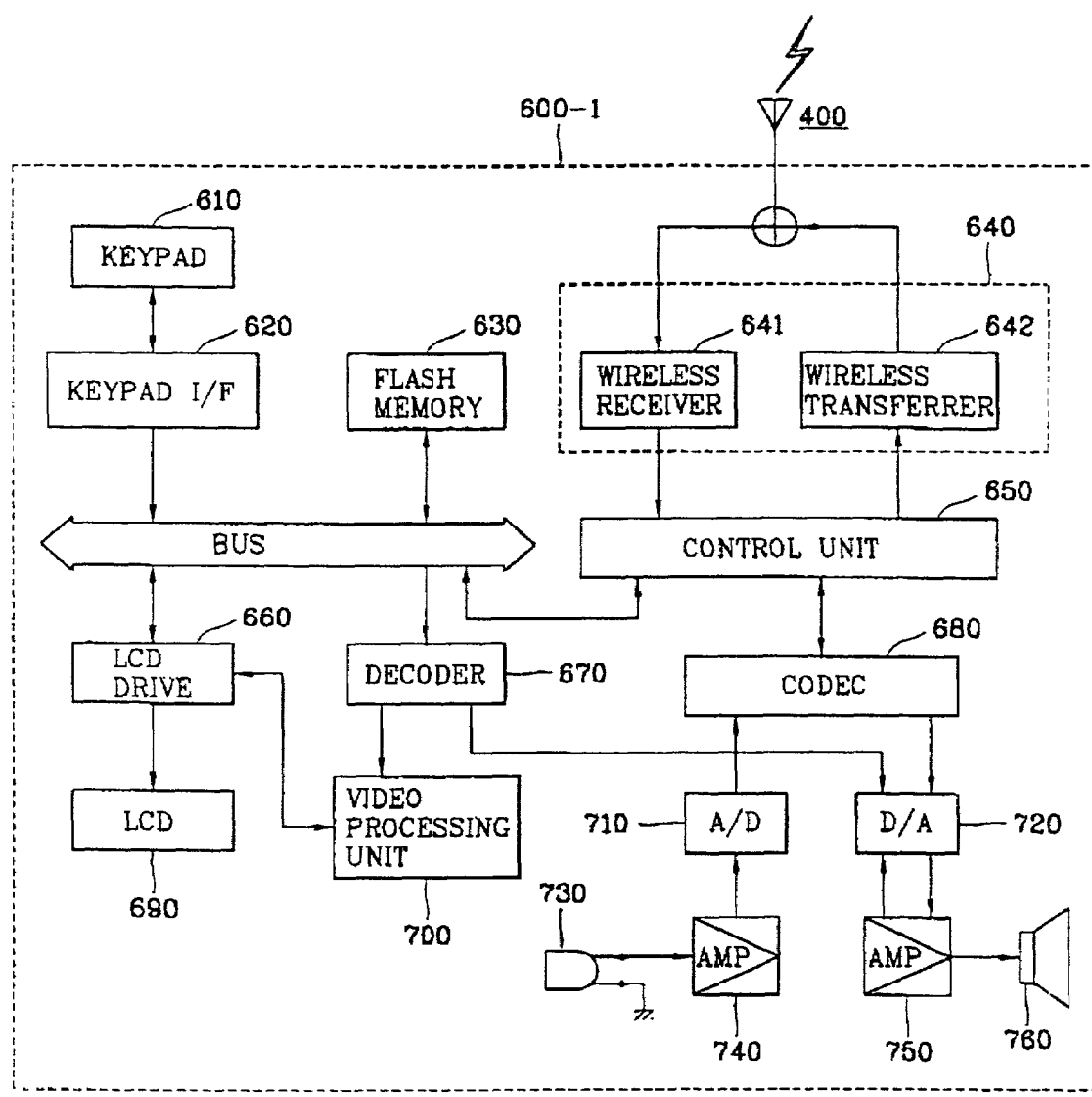
FIG. 3 is a block diagram illustrating the mobile phone according to a preferred embodiment of the present invention.

FIG. 3 is a block diagram showing a possible configuration of the personal terminal mobile phone reproducing the data file transferred from the network according to a preferred embodiment of the present invention. As shown therein, the mobile phone can include a keypad 610 for inputting data such as a phone number or other data, a keypad interface unit 620 for receiving the data inputted through the keypad 610, a flash memory 630 for storing a compression data file which can be inputted externally, an LCD (Liquid Crystal Display) 690 for displaying information such as a menu screen, information regarding a received message or other displayed data, an LCD driving unit 660, which can change the data from the keypad 610 to a signal which can be displayed on the LCD 690, a decoder 670 for decoding the data stored in the flash memory 630 into a signal which is able to be reproduced by a video processing unit 700 which can be used to change the decoded data from flash memory 630 through the decoder 670 to a signal for displaying on the LCD 690.

The mobile phone can also include a wireless transferring/receiving unit 640 for transferring and/or receiving data from a mobile communication network 400 to a control unit 650. The mobile phone can also include a microphone 730 for inputting a signal to the control unit 650, preferably audio, for recording through an amplifier 740 for amplifying the signal inputted from the microphone 730 to a certain level and an A/D (Analog/Digital) converter 710 for changing the amplified signal into a digital signal for transferring the digital signal to a codec 680 for compressing and/or amplifying the changed digital signal to be received by the control unit 650 for controlling reception, and storing and reproducing the data. The mobile phone can also include a D/A (Digital/Analog) converter 720 for changing the audio signal transferred from the decoder 670 and from the codec 680 into an analog signal for output through an output amplifier 750 for amplifying the changed analog signal and outputting the amplified signal through a speaker 760.

Figure 4:
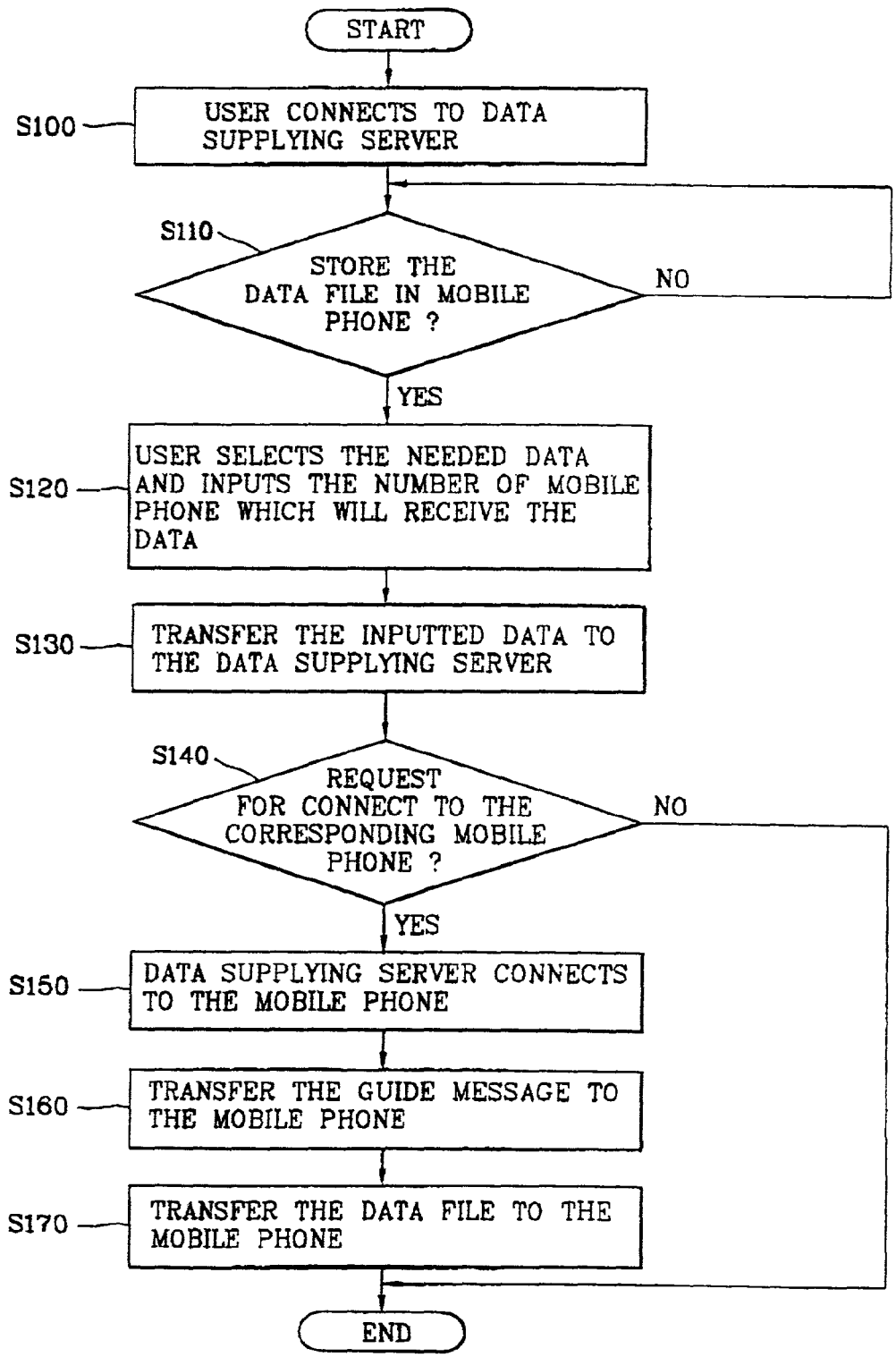
FIG. 4 is a flow chart showing data processing received in the mobile phone according to a preferred embodiment of the present invention.

FIG. 4 is a flow chart showing a preferred embodiment process of the present invention of supplying a data file to a wireless transceiver or personal terminal, such as a mobile phone used for illustrative purposes. As shown therein, in S100, a user can connect to the data supplying server 300 which can be connected to the communication network 200 using a personal computer in order to store a data file in the mobile phone. When the data supplying server 300 is connected, the user can select data in the data supplying server 300 and can then input a telephone number for a particular mobile phone 600 which will receive the data being selected and sent S120, and the user can also transfer the telephone number data to the data supplying server 300 S130.

The data supplying server 300 can transfer data files corresponding to the particular mobile phone 600 through a switching system of the mobile communication network 400. The switching system operates by the server asking to connect to the mobile phone 600 S140 and upon connection, the mobile communication network 400 can initiate a ringing sound on the mobile phone 600 corresponding the telephone number. If the particular mobile phone 600 receives the call, the data supplying server 300 can identify that the call connection is made S150, and can then transfer a message, such as an audio guide message S160, which can be "This is from xx supplying company. A message is being delivered to you. If you want to receive this data, please push the number 1", to the connected mobile phone 600.

When the audio signal transferred from the data supplying server 300 arrives in the wireless receiving unit 641 of the mobile phone 600, the wireless receiving unit 641 can change the signal into a base band signal and can output it to the control unit 650. If the inputted signal is an audio signal, the control unit 650 can restore the signal to an audio data file by corresponding protocol, and can output the data to the codec 680. The codec 680 can then decode the reproduced audio data, and can output it to the speaker 740 through the output amplifier 730, so that the user is able to listen the audio guide message supplied from the data supplying server 300.

If the user responds to the outputted audio signal, a response signal can be sent to the data supplying server 300, which in turn can transfer the corresponding data file to the mobile phone 600. If the user does not respond to the ringing sound of the mobile phone 600 within a certain period of time (for example, about 10 seconds), the control unit 650 of the mobile phone 600 can automatically transfer a response signal to the data supplying server 300. When the data supplying server 300 receives the response signal from the mobile phone 600, it can then transfer a selected data file to the mobile phone 600 through the mobile communication network 400 S170. Next, the data file can be stored in the flash memory 630 or any other type of memory of the mobile phone 600.

Figure 5:
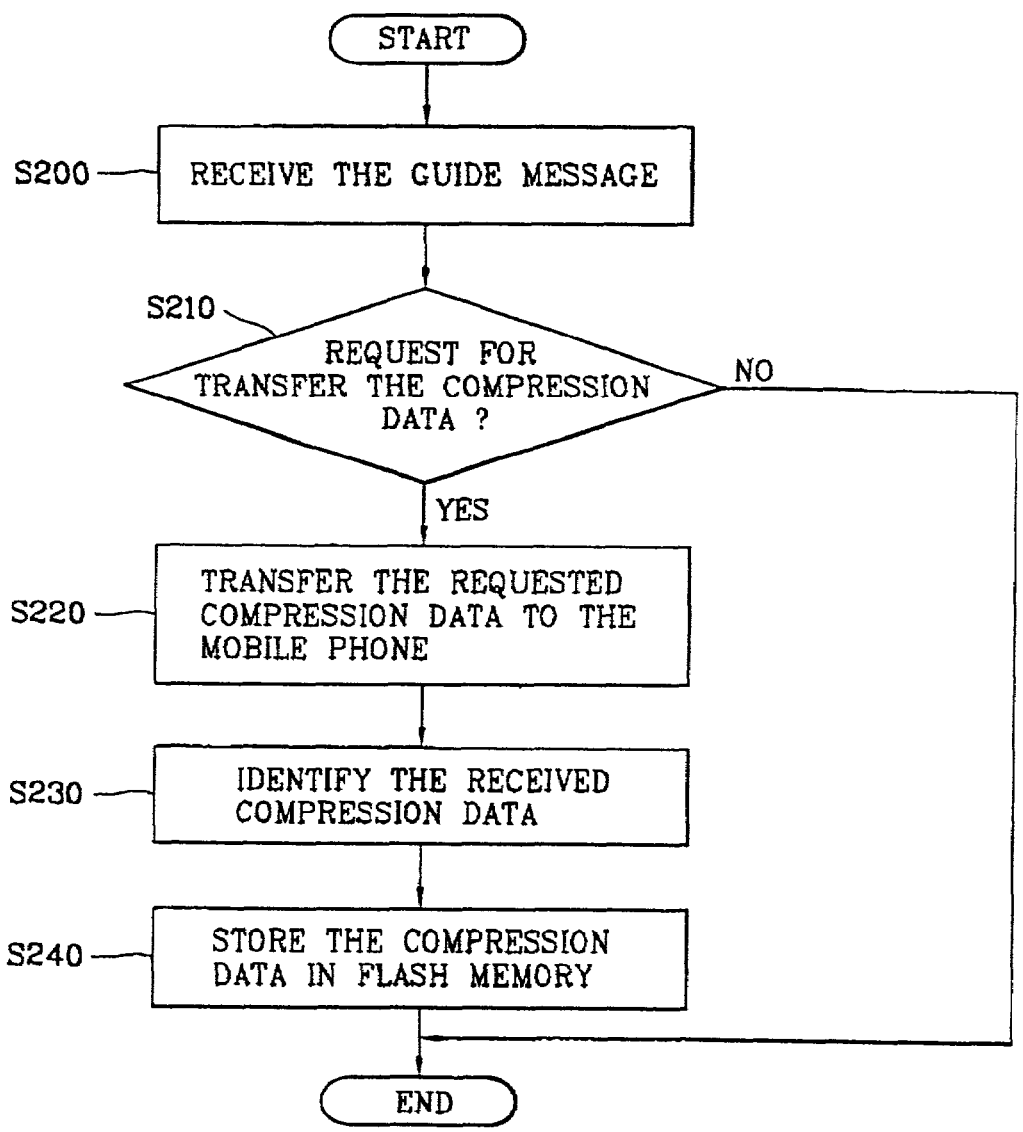
FIG. 5 is a flow chart showing steps included in a method for transferring compressed data in accordance with one embodiment of the present invention.

FIG. 5 is a flow chart showing another preferred embodiment of the data process for transferring a data file for reception by a wireless transceiver, a personal terminal, or mobile phone 600 for illustrative purposes, according to the present invention. As shown therein, if an audio guide message is transferred by a data supplying server 300 and received in the mobile phone 600 (S200), the user can listen to the message through their mobile phone 600. After that if the user wants to receive the data prompted by the message, the user can elect to receive the data and can, for example, push a key to request the data S210, which can be in a compression data form. The data supplying server 300 can then identify the request by the user for the data, and can then transfer audio/sentence message signaling or announcing the transference of the requested data, such as "according to your request, the requested music will be automatically registered and stored in your mobile phone", to the mobile phone 600 in the connected state. After the message is delivered, the data supplying server can transfer the requested compression data to the corresponding mobile phone 600 S220.

At that time, the data supplying server 300 transfers a data for identifying to the mobile phone in order to notify that the compression data will be transferred, whereby the mobile phone 600 identifies the data transferred after transferring the data for identifying as the compression data. The data for identifying comprises a sync header, a file name, and a file size. The sync header of the data for identifying is a unique value notifying a start point of the data for identifying. The file name is the name of the compression data. The file size represents the size of the compression data.

When the data file is transferred, the control unit 650 identifies the data transferred later as the compression data by the data for identifying from the data receiving unit 641 S230, and searches file name and the size of the transferred compression data file by the data for identifying transferred, and then stores the data in the flash memory 630 of the mobile phone 600 S240. This process continues until all the searched file size of compression data receiving and storing in the flash memory.

If the connection to the mobile phone 600 is not able to be made because, for example, the mobile phone 600 is turned off or is located in a region where a connection can not be made, and if the control unit 650 can automatically respond, the mobile communication network 400 can be set to repeatedly try to connect to the mobile phone 600. Upon connection, the control unit 650 can then store the compression data transferred in the flash memory 630 S240.

After the data is transferred, the data supplying server 300 can deliver to the mobile phone 600 a message such as "The data has been transferred to your mobile phone," in order to notify the user that the data has been transferred and stored in the mobile phone 600. The message can also be stored in the flash memory 630 for later access by the mobile phone user.

When the message is stored in the flash memory 630, the control unit 650 can also create and transmit a visual message to be outputted on the LCD 630 through the LCD driving unit 660. Thereby the user of the mobile phone 600 is able to read that the compression data has been stored. However, if the control unit 650 responds to a preset number of failed connection attempts or if the phone call is identified as a general phone call where the compression format cannot be received, the call can be cut off.

In case the connection to the mobile phone 600 is not made within a certain period of time (for example, within 10 seconds), the data supplying server 300 can ask to connect and the data supplying server 300 can transfer the compression data and the phone number of the receiver to the data storing space 500 associated with the mobile phone 600 for storage. The compressed data, an audio guide message, and the phone number of the mobile phone 600 may be stored in the data storing space.

The communication network 400 can also try to connect to the mobile phone 600. The communication network 400 can be used to receive the compression data by connecting to the mobile phone 600 or by transferring a short message such as "data arrived" in the stare of not connecting to the mobile phone 600. The user can then dentify the message and can connect to the data storing space 500, receive the data and store it in the memory 630 of the mobile phone 600.

According to one of the preferred process embodiment of the present invention described above, after the compression data is received in the mobile phone 600, the user can request the stored compression data through the use of the keypad 610. Accordingly, the control unit 650 can display the information of the data stored in the flash memory 630 on the LCD 690 through the LCD driving unit 660. The user can then see the information displayed on the LCD 690, and can select particular parts of the data for display using the keypad 610 to use the control unit 650 to search through the data in the flash memory 630. In addition, the control unit 650 can be used to determine whether the data is audio or video data, and can also transfer the data to the decoder 670.

If the compression data is audio data, the decoder 670 can be used to amplify the audio data and can also change the audio data into a reproduction of the original sound through the D/A converter 720, before transferring it to the output amplifier 750. The output amplifier 750 can be used to power amplify the reproduced sound and can output it through the speaker 760, whereby the user is able to listen to the sound. On the other hand, if the data is video data, the decoder 670 can be used to decode the video data and can then output the decoded data to the video processing unit 700. The video processing unit 700 can be used to compensate for any distortion of the decoded data, and can also output a signal to the LCD 690 to display a reproduction of the original video display on the LCD 690.

The process described above can also allow the user to connect to the communication network 200 using a personal computer (PC) 100 so that data from the PC 100 can be transferred to a mobile phone 600 as described with reference to FIG. 6 in more detail.

FIG. 6 illustrates a flow chart showing a preferred method for directly connecting to a data supplying server 300 using a mobile phone 600 according to the present invention. First, the user can connect to a data supplying server 300 connected to a mobile communication network 400 through the use of a keypad 610 on a mobile phone 600 S300. After the connection is made, the user can either select desired data files S330, or can use the data supplying server 300 to transfer the data files to another mobile phone 600 S360 by determining whether the user wants to transfer the data to a mobile phone of another person S310. If the transfer of the data to another mobile phone is desired, a request to connect to the corresponding other mobile phone can be initiated S340.

If the user wants to transfer the data to a mobile phone of the other person S310, S320, the user selects the data file and inputs the number of the other mobile phone for reception S330. The inputted number can then be sent to the data supplying server 300, and the data supplying server 300 can then request to connect to the corresponding other mobile phone connected to the mobile communication network 400 S340. The processing of the compression data transferred to the mobile phone 600 is same as that of the above embodiment, and therefore the process is omitted herein.

According to the request to connect S340, S350, when the user of the other mobile phone 600 responds, the data supplying server 300 can then output a set guide message to the connected mobile phone S370. After the user receives the message, if there is a request for transferring the data, the data supplying server 300 can then transfer the compression data to the corresponding mobile phone S380.

FIG. 7 is a flow chart showing another preferred method for transferring a recorded audio data to the personal terminal, for which a mobile phone is illustrated for illustrative purposes, according to the present invention. First, if a user can record audio data by selecting an audio recording button on the keypad 610 where a control unit 650 can then identify the recording button selected to control the audio recording function. Next, the flash memory 630 can be used to store the recorded audio. In more detail, after the recording button is activated, the user can input an audio signal through the microphone 730. Next, the inputted signal can be transferred to an A/D converter 710 through an input amplifier 740 to change the inputted signal into a digital signal. Then, the digital signal can be inputted into the codec 680, where the codec 680 can be used to compress the digital signal data and store it in the flash memory 630 of the mobile phone 600. The stored data can then be searched by the user for transference to other mobile phones S400.

If transfer of the signal stored in the flash memory 630 to another user is desired, the user can indicate such through pushing the keypad 610 and searching the audio data recorded in the flash memory 630 S400. After that, the user can select the data which will be transferred to the other user, and can input the other phone number of the other user (S420).

When the compression data and the phone number are selected, the control unit 650 can solicit a connection to the corresponding mobile phone 600 connected to the mobile communication network 400 according to the information inputted S430, S440. If the user of the other mobile phone wants the connection, the set guide message can be transferred to the corresponding mobile phone (S450).

After the guide message is delivered S450, if the other user wants to receive the data, the control unit 650 can be set to search the corresponding file in the flash memory 630 and can transfer the file to the codec 680. The codec 680 can then be used to decode the data, where the decoded data can be changed in the control unit 650 into a wireless transfer signal, and then the data can be transferred to the mobile phone of the other user through the data transferring unit 642 S460.

As described above, according to the present invention, the user is able to select desired data in simple way through a communication network, such as with PCs, or personal terminals, such as mobile phones or PDAs, having the function of reproducing the compression data. In addition, the user is able to store the data directly in the personal terminals, whereby the user is able to use the data, including listening or watching selected data through the personal terminal, including the data sent while the user is moving. Also, the user is able to record his own audio/music, and can then store it in the personal terminal or transfer it to another person's personal terminal, whereby making the personal terminal more convenient.

As the present invention may be embodied in several forms without departing from the spirit or essential characteristics thereof, it should also be understood that the above-described embodiments are not limited by any of the derails of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A data file reproducing method for a personal terminal, comprising:

selecting a data file;

connecting to a personal terminal;

transferring an audio guide message to the personal terminal when the connection is made;

receiving a request from the personal terminal to send the selected data file in response to the audio guide message; and transferring the selected data file to the personal terminal, wherein said connecting includes connecting a data supplying server to the personal terminal through a communication network by:

inputting an identifying number for the personal terminal; and determining whether a connection between the data supplying server and the personal terminal is completed, wherein the audio guide message is transferred to the personal terminal when the connection is made and the personal terminal responds, and wherein when a connection between the data supplying server and the personal terminal is not made, the data supplying server connects to the communication network by connecting a data storing space to the communication network, and wherein the method further comprises:

storing the selected data file, the guide message, and a telephone number of the personal terminal in the data storing space;

transferring a guide message to the personal terminal when the data storing space is connected to the personal terminal;

requesting transfer of the data file from the personal terminal by the personal terminal;

transferring the selected data file to the personal terminal according to the request for transfer of the personal terminal; and storing automatically the data file in the personal terminal, wherein said method further comprises:

providing an input window on a first terminal providing information for selecting the data file, the input window receiving information of the personal terminal including the telephone number of the personal terminal, and selecting at least one digital data file from a file list to be transmitted, wherein a title name of the selected data file is separately transmitted with the selected data file.

2. A method of claim 1, comprising:

receiving information from a first terminal identifying the personal terminal, said information including the telephone number of the personal terminal;

receiving information from the first terminal selecting the data file from a data file list; and transmitting the audio guide message including data for identifying the selected data file to the personal terminal based on the telephone number of the personal terminal, the data for identifying having file information of the data file, wherein the data file is transferred to the personal terminal in response to a signal received from the personal terminal requesting the data file.

3. The method of claim 2, wherein the data for identifying includes a synchronization code informing transmission of the data file and a type, capacity and name of the data file.

4. The method of claim 2, further comprising determining a transmission path based on a state of the second mobile terminal.

5. The method of claim 2, wherein said connection between the data supplying server and the personal terminal is not made corresponds to a condition where it is not possible to check a state of the personal terminal.

6. The method of claim 2, wherein said connection between the data supplying server and the personal terminal is not made corresponds to a condition where a capacity of the data file exceeds an allowable memory capacity of the personal terminal.

7. The method of claim 1, further comprising:

receiving first information for identifying the data file and second information for identifying a source of the data file;

checking a format of the selected data file; and determining whether to receive the selected data file or not based on whether the checked format of the selected data file has a predetermined data format.

8. The method of 7, wherein the first information is a title name.

9. The method of 7, wherein the second information is a sender name or phone number of a first terminal providing information for selecting the data file.

10. The method of 7, further comprising:

providing a partial part of the selected data file to be transmitted, wherein the partial part is a beginning part of the data file.

11. The method of claim 1, wherein the personal terminal is a mobile terminal and the first terminal is another mobile terminal.

12. The method of claim 7, wherein the predetermined data format is a preset compressed data format.

13. The method of claim 7, wherein the predetermined data format is an mp3 format.

14. A data file reproducing system comprising:

a first server for selecting a data file, connecting to a personal terminal, and transferring an audio guide message to the personal terminal when the connection is made, the first server receiving a request from the personal terminal to send the selected data file in response to the audio guide message, and transferring the selected data file to the personal terminal, wherein said connecting includes connecting a data supplying server to the personal terminal through a communication network by:

inputting an identifying number for the personal terminal; and determining whether a connection between the data supplying server and the personal terminal is completed, wherein the audio guide message is transferred to the personal terminal when the connection is made and the personal terminal responds, and wherein when a connection between the data supplying server and the personal terminal is not made, the data supplying server connects to the communication network by connecting a data storing space to the communication network, and wherein the method further comprises:

storing the selected data file, the guide message, and a telephone number of the personal terminal in the data storing space;

transferring a guide message to the personal terminal when the data storing space is connected to the personal terminal;

requesting transfer of the data file from the personal terminal by the personal terminal;

transferring the selected data file to the personal terminal according to the request for transfer of the personal terminal; and storing automatically the data file in the personal terminal.

15. The system of claim 14, wherein said connection between the data supplying server and the personal terminal is not made corresponds to a condition where it is not possible to check a state of the personal terminal.

16. The system of claim 14, wherein said connection between the data supplying server and the personal terminal is not made corresponds to a condition where a capacity of the data file exceeds an allowable memory capacity of the personal terminal.

17. The system of claim 14, wherein the personal terminal receives first information for identifying the data file and second information for identifying a source of the data file, and wherein the personal terminal checks a format of the data file and determines whether to receive the data file or not based on whether the checked format of the data file has a predetermined data format.

* * * * *